United States Patent [19]
Matsumoto et al.

[11] Patent Number: 6,116,221
[45] Date of Patent: Sep. 12, 2000

[54] GASOLINE VAPOR PURGING SYSTEM OF INTERNAL COMBUSTION ENGINE

[75] Inventors: Mikio Matsumoto; Masaya Furushou; Shigeaki Kakizaki; Hiraku Ooba, all of Yokohama, Japan

[73] Assignee: Nissan Motor Co., Ltd., Yokohama, Japan

[21] Appl. No.: 09/112,443

[22] Filed: Jul. 9, 1998

[30] Foreign Application Priority Data

Jul. 10, 1997 [JP] Japan .................................. 9-185144

[51] Int. Cl.[7] .................................................. F02M 37/04
[52] U.S. Cl. ........................................ 123/520; 123/295
[58] Field of Search .................................. 123/516, 518, 123/519, 520, 698, 295, 430

[56] References Cited

U.S. PATENT DOCUMENTS

| | | | |
|---|---|---|---|
| 4,867,126 | 9/1989 | Yonekawa et al. ...................... | 123/520 |
| 5,566,655 | 10/1996 | Rumez et al. ........................... | 123/698 |
| 5,619,973 | 4/1997 | Hara et al. .............................. | 123/520 |
| 5,626,122 | 5/1997 | Azuma .................................... | 123/698 |
| 5,655,507 | 8/1997 | Kawasaki ................................ | 123/698 |
| 5,699,778 | 12/1997 | Muraguchi et al. .................... | 123/698 |
| 5,735,255 | 4/1998 | Farmer et al. .......................... | 123/698 |
| 5,746,187 | 5/1998 | Ninomiya et al. ...................... | 123/698 |
| 5,765,541 | 6/1998 | Farmer et al. .......................... | 123/698 |
| 5,806,501 | 9/1998 | Osanai .................................... | 123/698 |
| 5,950,603 | 9/1999 | Cook et al. ............................. | 123/520 |

FOREIGN PATENT DOCUMENTS

| | | |
|---|---|---|
| 488 254 A | 6/1992 | European Pat. Off. . |
| 2-169834 | 6/1990 | Japan . |
| 7-42588 | 2/1995 | Japan . |
| 62-191622 | 8/1997 | Japan . |
| 2 300 278 A | 10/1996 | United Kingdom . |

*Primary Examiner*—Thomas N. Moulis
*Attorney, Agent, or Firm*—Foley & Lardner

[57] ABSTRACT

In an internal combustion engine of gasoline direct injection type, there is arranged a gasoline vapor purging system. The vapor purging system has a vapor purging section which temporarily traps gasoline vapor produced in a fuel supply section of the engine and feeds the gasoline vapor through a vapor purge conduit into an intake section of the engine upon operation of the engine. In the vapor purge conduit, there is installed an electrically actuated valve which controls the flow of the gasoline vapor toward the intake section. The vapor purging system has further a control unit which controls operation of the valve so that a target purging rate of the gasoline vapor toward the intake section is determined based on an amount of gasoline injected to each combustion chamber of the engine through an injector.

14 Claims, 5 Drawing Sheets

GASOLINE VAPOR PURGING SYSTEM OF INTERNAL COMBUSTION ENGINE

The contents of Japanese Patent Application 9-185144 filed Jul. 10, 1997 are hereby incorporated by reference.

BACKGROUND OF THE INVENTION

1. Field of the Invention

The present invention relates in general to evaporation emission controls (EEC) of motor vehicles powered by internal combustion engines, which prevent the escape of gasoline vapors from the fuel tank and fuel supply system, whether or not the engine is running More specifically, the present invention relates to a gasoline vapor purging system for use in an internal combustion engine of a gasoline direct injection type.

2. Description of the Prior Art

For preventing the escape of gasoline vapors from the fuel supply section such as a fuel tank or the like, most vehicles built during these days use an activated charcoal canister to trap the vapors when the engine is shut off. Upon restarting, a flow of filtered air through the canister purges the vapors from the charcoal. The mixture goes through a vapor purge pipe feeding into an intake section of the engine and it is burnt in the engine.

In a gasoline vapor purging system disclosed by Japanese Patent First Provisional Publication 7-42588, a purge control valve is used for controlling the flow off vapors in the vapor purge pipe in accordance with an operation condition of the engine. That is, in the conventional vapor purging system, a target vapor purging rate (viz., target open degree of the purge control valve) is determined in accordance with the flow rate of air (viz., intake air) led into the engine.

However, hitherto, the vapor surging system has been given little thought in internal combustion engines of a type which can switch between a so-called "stoichiometric combustion mode" wherein the engine operates on a mixture of stoichiometric air/fuel ratio and a so-called "lean combustion mode" wherein the engine operates on a mixture of higher (or lean) air/fuel ratio. That is, to allow the engine to operate in the lean combustion rode, it is necessary to increase the flow rate of the intake air by increasing the open degree of a throttle valve. Thus, if the target vapor purging rate is determined in accordance with the flow rate of the intakes air like in case of the Publication 7-42588, the lean combustion mode is forced to induce excessive vapor purging, which tends to lower combustibility of the mixture in combustion chambers.

In internal combustion engines operating on gasoline, there is a so-called "gasoline direct injection type" wherein fuel (viz., gasoline) is directly injected into combustion chambers. The engines of such type disclosed by Japanese Patent First Provisional Publications 62-191622 and 2-169834 have two combustion modes of early and late injection of fuel. That is, injection early in the intake stroke produces a homogeneous mixture for high-load conditions, while the late injection delays the event until near the end of the compression stroke to create a stratified mixture for low-load conditions. The stratified mixture generally consists of a first layer of richer mixture which is easily ignited by an ignition plug and a second layer of leaner mixture which is ignited by the burning of the first layer of mixture. Combustion of the stratified mixture realizes ultra-lean combustion and thus brings about improvement in fuel economy due to reduction in pumping loss.

However, as is known, combustion of stratified mixture is very sensitive to a change in air/fuel ratio and thus easily affected by the above-mentioned vapor purging and the exhaust gas recirculation (EGR). That is, if the stratified mixture becomes to have an outer layer whose air/fuel ratio is too high (viz., too lean) due to affection by the vapor purging and/or the exhaust gas recirculation (EGR), appropriate combustion of the outer layer is not obtained, which increases a possibility of remaining unburned substances in the combustion chambers. While, if the stratified mixture has a too low air/fuel ratio (viz., too rich mixture) in total, appropriate combustion of the mixture is not obtained also, which increases a possibility of exhausting much smoke and thus increasing fuel consumption, For solving the above-mentioned drawbacks, a measure may be thought out wherein during combustion of the stratified mixture, the vapor purging is inhibited or at least turned Down. However, in this case, the performance of the gasoline Vapor purging system per se is sacrificed. That is, fuel (viz., gasoline vapors) trapped by the charcoal canister can not be completely purged from the charcoal canister under operator of the engine, so that it tends occur that when the engine is stopped, the canister exhibits its saturation condition in adsorbing vapors. In this case, gasoline vapor generated thereafter can not be trapped is by the canister any longer, which permits escape of the vapor into the atmosphere.

SUMMARY OF THE INVENTION

It is therefore an object of the present invention to provide a measure which is free of the above-mentioned drawbacks.

According to the present invention, there is provided a gasoline vapor purging system of an internal combustion engine of gasoline direct injection type, which optimally carries out the vapor purging in accordance with the combustion of the engine.

According to the present invention, there is provided a gasoline vapor purging system for an internal combustion engine of gasoline direct injection type. The system comprises a vapor purging section which temporarily traps gasoline vapor produced in a fuel supply section of the engine and feeds the gasoline vapor through a vapor purge conduit to an intake section of the engine upon operation of the engine; an electrically actuated valve installed in the vapor purge conduit to control flow of the gasoline vapor toward the intake section; and a control unit which controls operation of the valve so that a target purging rated of the gasoline vapor directed toward the intake section is determined based on an amount of gasoline injected to each combustion chamber of the engine through an injector.

According to the present invention, there is further provided a gasoline vapor purging control system for use with an internal combustion engine which has a vapor purging section which temporarily traps gasoline vapor produced in a fuel supply system of the engine and feeds the same to an intake section of the engine upon operation of the engine. The control system comprises first means for determining a target vapor purging rate based on an amount of fuel fed to each combustion chamber of the engine; second means which, when the engine operates on a stratified lean mixture, corrects the target vapor purging rate in accordance with a target air/fuel ratio of the mixture; and third means for selectively controlling the vapor purging effected by the vapor purging section in accordance with the target vapor purging rate and the corrected target vapor purging rate.

DETAILED DESCRIPTION OF THE INVENTION

Figure 1:
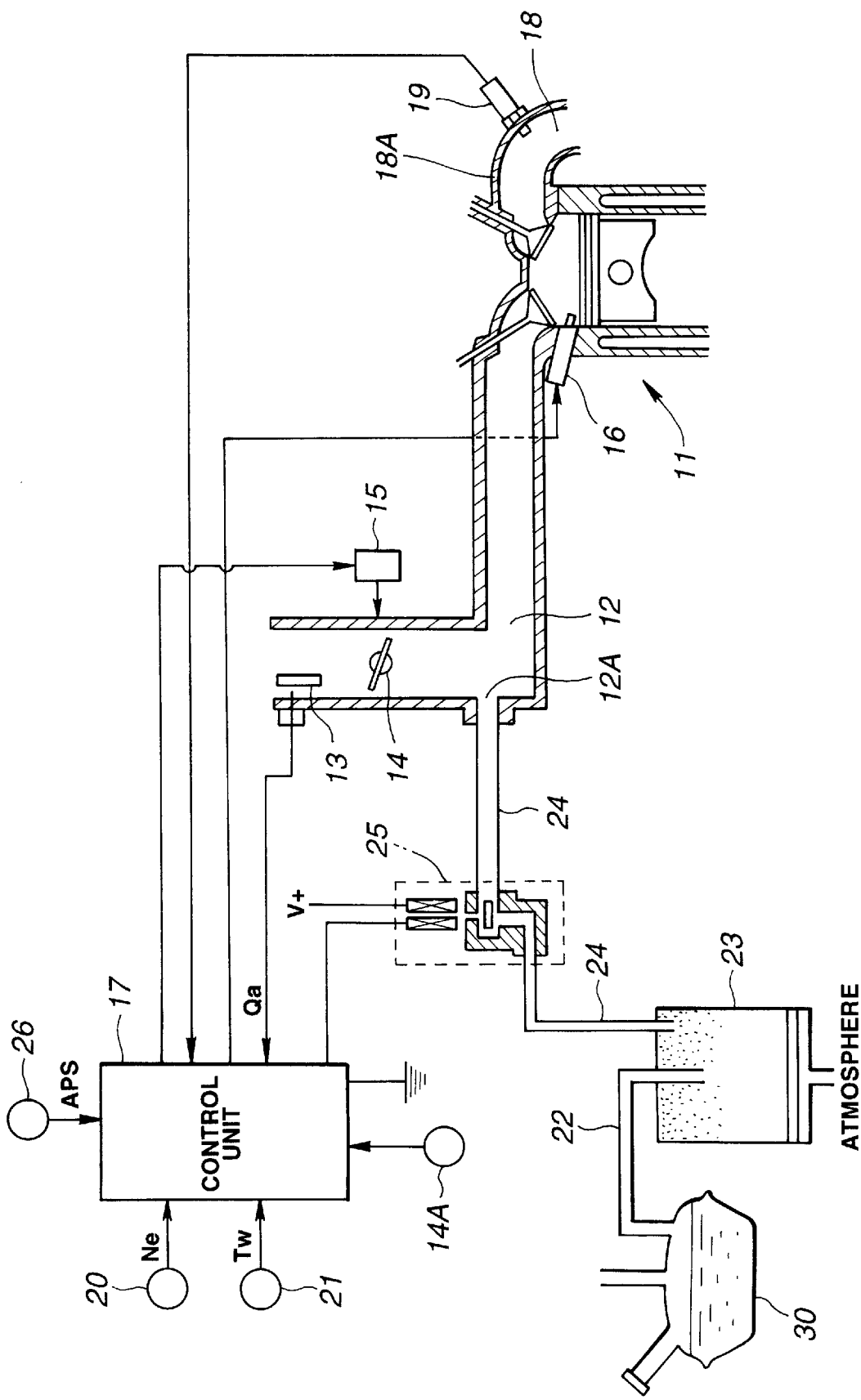
FIG. 1 is a schematic view of a gasoline vapor purging system according to the present invention.

Referring to FIG. 1 of the drawings, there is shown in schematic form a gasoline vapor purging control system of the present invention, which is incorporated with an internal combustion engine 11 of a gasoline direct injection type.

In an upstream single conduit part of an air intake section 12 of the engine 11, there are installed an air flow meter 13 and a throttle valve 14 which is positioned downstream of the air flow meter 13 as shown. Although not shown in the drawing, an air cleaner is connected to an upstream end of the single conduit part of the intake section 12, by which air introduced into the intake section 12 is cleaned. The intake section 12 has an intake manifold which comprises a united part constituting the upstream single conduit part and a plurality of branches extending from the united part to intake ports of respective combustion chambers. The air flow meter 13 measures the flow rate "Qa" of the intake air, that is, the amount of intake air per unit time. The throttle valve 14 thus controls the flow rate "Qa" of the intake air. Electromagnetic fuel injectors 16 are arranged to directly inlet metered fuel into respective combustion chambers of the engine 11. Each fuel injector 16 is controlled by a control unit 17 which has a microcomputer installed therein. That is, by processing various information signals applied thereto from various sensors, the control unit 17 issues an instruction pulse signal to each of the fuel injectors 16 to control the amount of fuel injected into the corresponding combustion chamber.

A throttle valve control device 15 is provided, which can electronically control the open degree of the throttle valve 14 in accordance with an instruction signal applied thereto from the control unit 17. For this control, an information signal from an accelerator sensor 26 is also ted to the control unit 17. That is, through the throttle valve control device 15, the open degree of the throttle valve 14 is controlled in accordance with the engine operation condition determined based on the information signals from the sensors. For detecting the open degree of the throttle valve 14, a throttle sensor 14A is provided which feeds the on control unit 17 with an information signal representing the open degree of the throttle valve 14. In place of the throttle sensor 14A, an idling sensor may be used.

In an exhaust passage 18 of the engine 11, there is installed an oxygen sensor 19 of which information signal is fed to the control unit 17, More specifically, the oxygen sensor 19 is installed in an united pare of branches of the exhaust manifold 18A. As is known, by measuring en concentration in the exhaust gas by the oxygen Sensor 19, an air/fuel ratio of the mixture fed to the engine 11 is detected. Thus, the oxygen sensor 19 is also known as an air/fuel ratio sensor.

A crank angle sensor 40 is installed in a distributor (not shown), which issues a crank angle signal in synchronization with the engine speed. By counting pends of the signal in a unit time, or by detecting the period of the base crank angle, the engine speed "Ne" is detected. A temperature sensor 21 is further provided which detects the temperature "TW" of cooling water of the engine 11.

The information Signal front the accelerator sensor 26 represents a depression degree "APS" by which an accelerator pedal (not shown) is depressed by a driver. It is to be noted that the depression degree "APS" corresponds to an engine output torque needed by the driver.

Gasoline vapors from a fuel tank 30 are led to an activated charcoal canister 23 through a vapor pipe 22, so that the vapors are contemporarily trapped by the canister 23. An upper space in the canister 23 is connected through a vapor purge pipe 24 to a purge port 12A which is formed in the united upstream part of the intake manifold of the intake section 12 downstream of the throttle valve 14. To the purge pipe 24, there is connected a purge control valve 25 which is controlled by the control unit 17. That is, open timing and open period of the valve 25 are controlled by the control unit 17 in a duty-ratio control manner, A stepping motor may be used as the control valve 25.

In the computer of the control unit 17, the following programmed operation steps are executed for controlling the purging of gasoline vapors.

Figure 2:
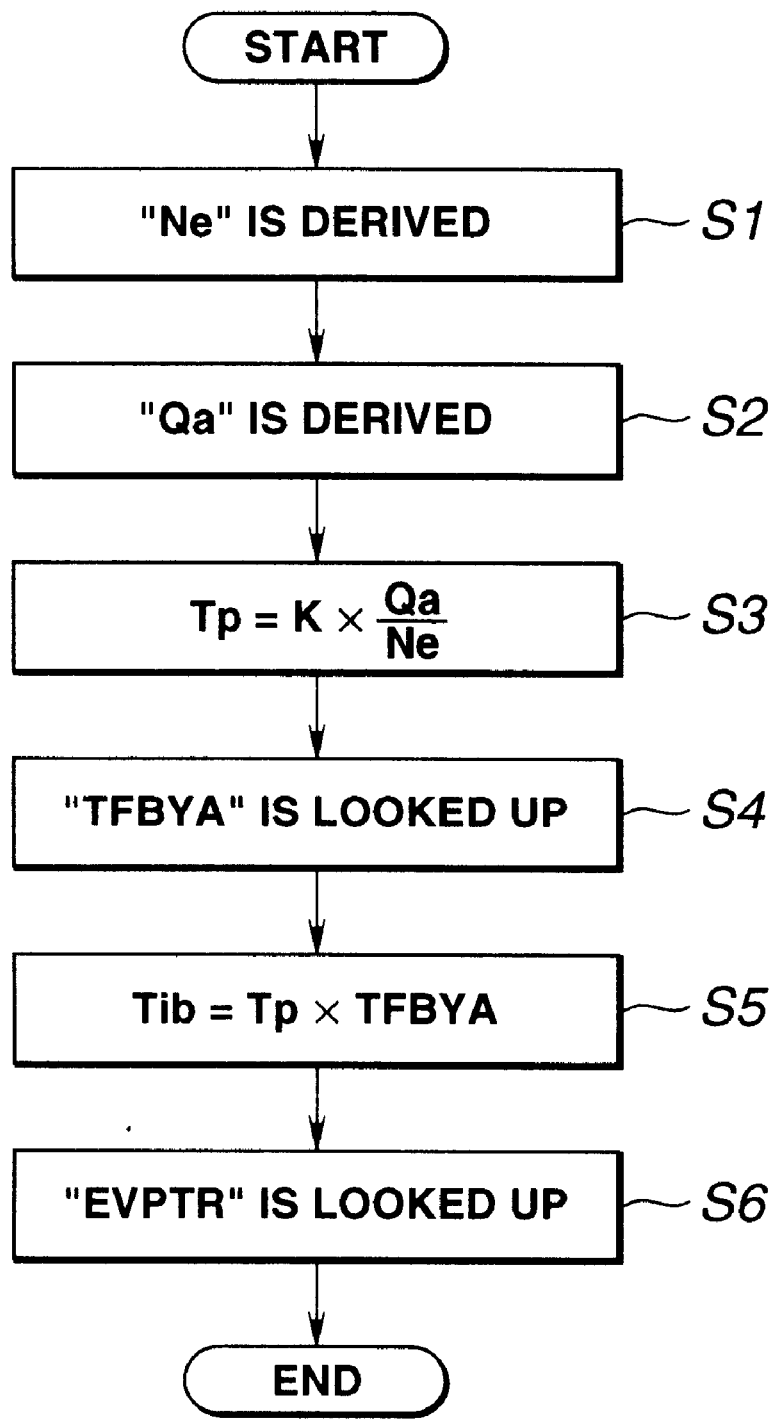
FIG. 2 is a flowchart showing programmed operation steps executed by a control unit for deriving a target purging rate.

FIG. 2 is a flowchart showing operation steps for deriving a target purging rate "EVPTR" based on an amount "Tib" of injected fuel, For ease of description, the amount "Tib" will be referred to as "fuel injection amount" in the following.

That is, at step S1, the engine speed "Ne" is derived from the signal issued from the crank angle sensor 20. At step S2, the flow rate "Qa" of intake air is derived from the signal issued from the air flow meter 13. At step S3, a basic amount "Tp" of injected fuel for each combustion chamber is derived from the following equation:

$$Tp = k \times Qa/Ne \qquad (1)$$

wherein:
k: constant

In fact, the basic amount "Tp" is the amount of injection fuel which brings about a stoichiometric air/fuel ratio.

At step S4, a target equivalence ratio "TFBYA" is looked up from a data map which shows a relationship between various operation conditions of the engine and equivalence ratios. The operation conditions of the engine are a stoichiometric combustion condition wherein the engine operates on a mixture of stoichiometric air/fuel ratio, a lean combustion condition wherein the engine operates on a lean mixture, a stratified charge combustion condition wherein the engine operates on a stratified charge of mixture, a homogeneous charge combustion condition wherein the engine operates on a homogeneous charge of mixtures high/low load combustion condition wherein the engine operates on a mixture under high/low load, etc.,.

At step S5, a fuel injection amount "Tib" is derived from the following equation:

$$Tib = Tp \times TFBYA \qquad (2)$$

Figure 3:
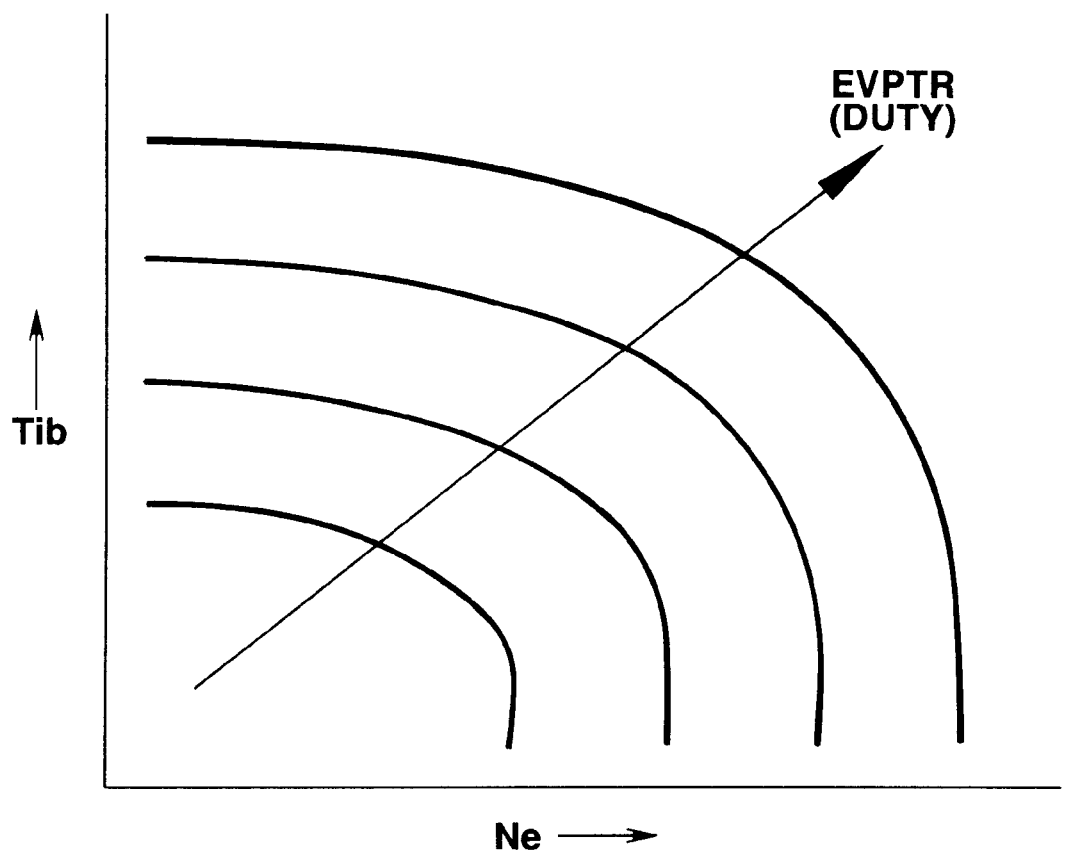
FIG. 3 is one of data maps used for determining the target purging rate, which shows a relationship between an engine speed, an amount of injected fuel, and a target purging rate.

Then, at step S6, a target purging rate "EVPTR" is looked up from a data map which, as is s from FIG. 3, shows a relationship between the fuel injection amount "Tib", engine speed "Ne" and target purging rate "EVPTR".

As is understood from the above, in the present invention, the target purging rate "EVPTR" is determined based on the amount "Tib" of fuel actually injected into the combustion chamber, that is, based on a target torque of the engine. In other words, in the present invention, the target purging rate "EVPTR" is not determined on the basic amount "Tp" of injected fuel which brings about a stoichiometric air/fuel ratio.

Accordingly, even when, under operation of lean combustion mode, the open degree of the throttle valve 14 is further increased for achieving a target lean mode combustion and thus the flow rate of intake air fed to each combustion chamber is increased, it is possible to fit the vapor purging rate to a combustion condition of the engine, that is, to the amount of fuel actually injected to each combustion chamber. Accordingly, according to the present invention, undesired excessive vapor purging, which would occur in the above-mentioned conventional is vapor purging control system in such condition, is suppressed or at least minimized.

If desired, the fuel injection amount "Tib" may be derived from other methods. That is, the fuel injection amount "Tib" can be derived from a pulse duration "Ti" of a fuel injection pulse signal which is issued from a control unit under normal fuel injection operation of the engine. As is known, the fuel injection pulse signal issued under such normal operation of the engine is provided in accordance with the existing condition of the engine, that is, with respect to a target equivalence ratio, various correction factors, etc.,.

Figure 4:
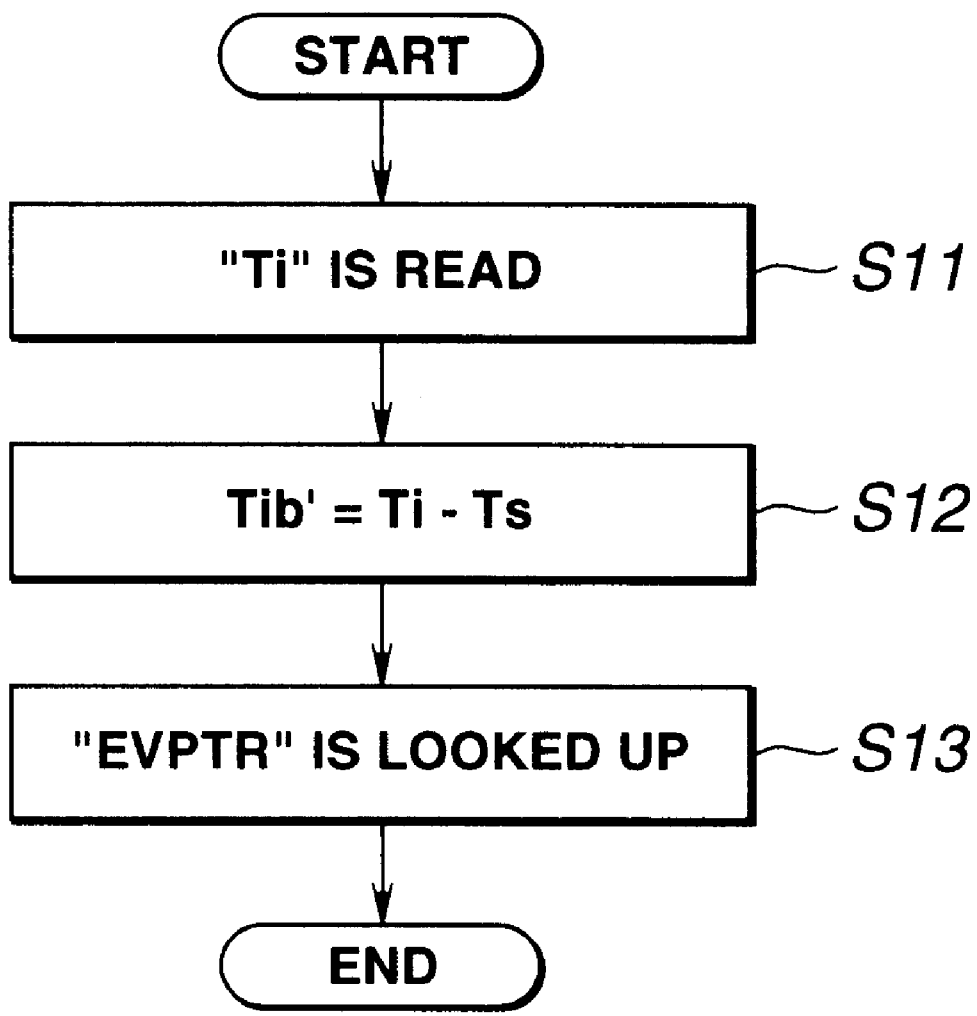
FIG. 4 is a flowchart similar to FIG. 2, but showing the other method for deriving the target purging rate.

FIG. 4 is a flowchart showing programmed operation steps executed for deriving the target purging rate "EVPTR" from the pulse duration "Ti".

At step S11, the pulse duration "Ti" of a fuel injection pulse signal is read. Usually, the pulse duration "Ti" is determined from the following equation:

$$Ti = Tp \times COEF \times TFBYA + TS \quad (3)$$

wherein:
Tp: basic amount of injected fuel for achieving stoichiometric air/fuel ratio;
COEF: coefficient;
TFBYA: target equivalent ratio;
TS: invalid fuel injection pulse.

At step S12, a fuel injection amount "Tib" is derived from the following equation:

$$Tib' = Ti - Ts \quad (4)$$

wherein:
Ts: invalid pulse duration.

At step S13, a target purging rate "EVPTR" is looked up from a data map which, as is understood from FIG. 3, shows a relationship between the fuel injection amount "Tib'", engine speed Ne and target purging rate "EVPTR".

Figure 5:
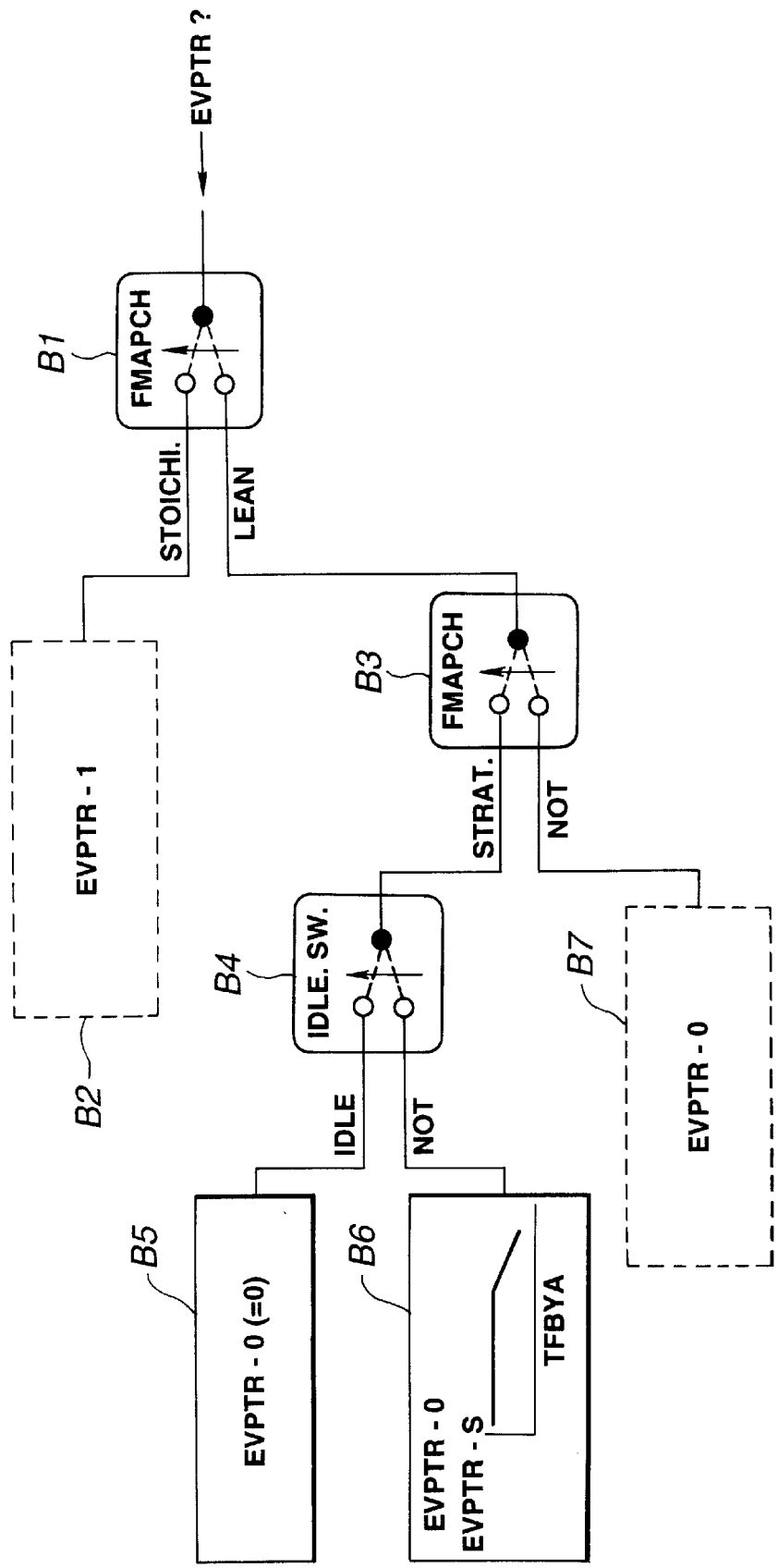
FIG. 5 is a flow table showing work steps executed by a control unit for determining various target purging rates.

FIG. 5 is a flow table showing work steps executed by the control unit 17 for deriving the target purging rate. As will become apparent as the description proceeds, the target purging rate changes depending on the operation condition of the engine, that is, whether the engine operates under stoichiometric combustion mode, lean combustion mode, stratified mixture combustion mode, homogeneous combustion mode or so.

At block B1, judgment is carried out as to whether the engine is operating under stoichiometric combustion mode or lean combustion mode. That is, for example, by looking up a data map "FMAPCH" which represents a relationship between the engine operation condition (engine speed, torque produced, etc.,) and combustion mode, such judgment is achieved. When it is judged that the engine is operating under stoichiometric combustion mode, block B2 is selected, while, when it is judged that the engine is operating under lean combustion mode, block B3 is selected. At block B2, a target purging rate "EVPTP-1" for the stoichiometric combustion mode is looked up from a corresponding data map, such as that shown in FIG. 3. While, at block B3, judgment is carried out as to whether the lean combustion is a stratified combustion or a non-stratified combustion. That is, for example, by looking up a data map "FMAPCH" which represents relationship between the engine operation condition (engine speed, torque produced, etc.,) and combustion type, such judgment is achieved. When it is judged that the seen combustion is the stratified combustion, block B4 is selected, while, when it is judged that the lean combustion is the non-stratified (combustion, block B7 is selected. At block B7, that is, when the engine is operating on a non-stratified lean air/fuel mixture, a target purging rate "EVPTR-0" is looked up from a corresponding data map, such as that shown) in FIG. 3. At block B4, judgment is carried out as to whether the engine is idling or not, That is, when the throttle sensor 14A issues a signal representing 0 (zero) open degree of the throttle valve 14, block B5 is selected judging that the engine is under idling. While, when the throttle sensor 14A issues a signal representing the throttle valve 14 being open, block B6 is selected judging that the engine is not under idling. At block B5, that is, when the engine is idling on a stratified lean mixture, the target purging rate "EVPTR-0" is set to 0 (zero) having regard to a fact that under such condition the combustibility of the mixture is easily affected by the vapor purging. While, at block B6, that is, when the engine is normally operating on a stratified lean mixture, a target purging rate "EVPTR-0" is looked up front a corresponding data map, such as that shown in, FIG. 3. For deriving the rate "EVPTR-0", the above-mentioned operation steps of FIG. 2 or FIG. 4 are executed. As is known, the influence of vapor purging to the combustion of stratified lean mixture under normal operation of the engine is very low as compared faith that to the combustion of the same under idling operation of the engine, but high as compared with that to the combustion of homogeneous lean mixture under normal operation of the engine. Thus, as is seen from the map illustrated in block B6, When the target equivalence ratio "TFBYA" exceeds a predetermined level, that is, when a target air/fuel ratio under the stratified combustion of lean mixture becomes higher (viz., leaner) than a predetermined level, a certain limitation is applied to the target purging rate "EVPTR-0". That is, the target purging rate "EVPTR-0" is saturated at the level of "EVPTR-S". More specifically, because, with increase of the target air/fuel ratio (viz., with decrease of the target equivalence ratio "TFBYA", or as the mixture becomes leaner), the influence of the vapor purging to the combustion in becomes higher, the target purging rate "EVPTR-0" has the upper limitation of "EVPTR-S".

As is known, in the homogeneous charge combustion, fuel is entirely spread in the combustion chamber to produce a homogeneous air/fuel mixture, while, in, the stratified charge as combustion, fuel is partially spread in the combustion chamber to produce an easily combustible air/fuel mixture at only a given portion of the chamber. Accordingly, in the stratified charge combustion, fuel in the purged vapor from the charcoal canister affects the combustion of tire mixture relatively hard. This phenomenon becomes much severe ashen the mixture becomes leaner, that is, when the fuel injection amount becomes less. Thus, if the target purging rate "EVPITR-0" is determined simply based on the fuel injection amount "Tib", such undesired phenomenon can not be eliminated or lowered. However, if the target purging rate "EVPTR-0" is processed to have the upper limitation of "EVPTR-S" in such a manner as is described hereinabove, such undesired phenomenon can be eliminated or at least minimized.

In the control unit 17, an open degree of the purge control valve 25, more specifically, a duty ratio of an instruction pulse signal applied thereto which achieves the target purging rate "EVPTR" (viz., EVPTR-0 or EVPTR-1) is looked up from a corresponding data map. When receiving such instruction pulse signal from the control unfit 17, the purge control valve 25 controls its open timing and open period.

As is described hereinabove, the present invention, the target purging rate is determined based on the fuel injection amount "Tib" or Tib'" irrespective of whether the combustion is a stratified lean mixture combustion or a honogeneous lean mixture combustion. Accordingly, even then, under a lean mixture combustion mode, for achieving a target air/fuel ratio in the mode, the open degree of the throttle valve 14 is increased by a degree greater than that in cast of a stoichiometric combustion mode to achieve a target lean air/fuel ratio and thus the amount of air fed into each combustion chamber is increased, the gasoline vapor purging is appropriately carried out in accordance with the combustion condition in the combustion chamber without being affected by the increased air amount. In other words, under such condition, the vapor purging rate is determined in accordance with the fuel injection amount "Tib" or "Tib'". That is, undesired excessive vapor purging, which would lower combustibility of the learn mixture, is eliminated or at least minimized.

Under a stratified lean mixture combustion mode, the target purging rate "EVPTR" is determined in accordance with the target equivalence ratio "TFBYA" (or target air/fuel ratio), Thus, even under such mode wherein the combustion of lean mixture would be easily affected by the vapor purging, satisfied combustibility of the mixture is kept while assuring optimal gasoline vapor purging. Thus, as compared with the above-mentioned conventional technique wherein under stratified lean mixture combustion the vapor purging is inhibited or at least turned down, the invention can exhibit a marked performance in the vapor purging. In other words, in the invention, the vapor purging and the combustibility of the stratified lean mixture are both improved at the same time. That is, even under the stratified lean mixture combustion mode, the vapor purging is sufficiently carried out.

If desired, the target purging rate "EVPTR" (viz., EVPTR-0, EVPTR-1, EVPTR-S) may be corrected in accordance with the concentration of the purged vapor. For example, the correction is so made that the target purging rate reduces with increase of the concentration of the vapor. For measuring the concentration of the vapor, a hydrocarbon concentration sensor is mounted in the vapor purge pipe 24 (see FIG. 1). Furthermore, the concentration of the vapor may be derived from a difference between an air/fuel ratio correction, factor "α" set for a feedback control of the engine under a mode wherein the vapor purging is not carried out and another air/fuel ratio correction factor β" set for the feedback control of the engine under a mode wherein the vapor purging is carried out. As is known, in the feedback control of the engine, by processing an information signal issued from an oxygen sensor 19 (or air/fuel ratio sensor), the existing air/fuel ratio of mixture is controlled to a stoichiometric value.

Furthermore, if desired, the target purging rate "EVPTR" may be corrected in accordance with the rate of exhaust gas recirculation (EGR). That is, for example, the correction is so made that the target purging rate reduces with increase of the rate of EGR.

Furthermore, if desired, the targets purging rate "EVPTR" may be corrected in accordance with the amount "OGA" of operation gas which is represented by the following equation:

$$OGA = (Q_A + Q_{EGR} + Q_{PURGE})/F_R \quad (5)$$

wherein:
   $Q_A$: amount of air measured by air flow meter 13,
   $Q_{EGR}$: amount of exhaust gas fed back to combustion chamber,
   $Q_{PURGE}$: amount of air in gasoline vapor,
   $F_R$: rate of amount of fuel.

What is claimed is:

1. A gasoline vapor purging system for an internal combustion engine of gasoline direct injection type, comprising:
   a vapor purging section which temporarily traps gasoline vapor produced in a fuel supply section of the engine and feeds the gasoline vapor through a vapor purge conduit into an intake section of the engine upon operation of the engine;
   an electrically actuated valve installed in said vapor purge conduit to control the flow of the gasoline vapor toward said intake section; and
   a control unit which controls operation of said valve so that a target purging rate of the gasoline vapor directed toward the intake section is determined based on an amount of gasoline injected to each combustion chamber of the engine through an injector and based on a predetermined relationship between gasoline amount and purging rate.
   wherein, when said engine operates on a stratified lean mixture, said control unit corrects said target purging rate in accordance with a target air/fuel ratio of the mixture,
   wherein the predetermined relationship is based in part on a particular engine operation mode.

2. A gasoline vapor pursing system as claimed in claim 1, in which when said engine operates on a stratified lean mixture, said control unit corrects said target purging rate in accordance with a target air/fuel ratio of the mixture.

3. A gasoline vapor purging system as claimed in claim 2, in which said target purging rate and the corrected target purging rate are each corrected in accordance with the concentration of the gasoline vapor in said vapor purge conduit.

4. A gasoline vapor purging system for an internal combustion engine of gasoline direct injection type, comprising:
   a vapor purging section which temporarily traps gasoline vapor produced in a fuel supply section of the engine and feeds the gasoline vapor through a vapor purge conduit into an intake section of the engine upon operation of the engine;
   an electrically actuated valve installed in said vapor purge conduit to control the flow of the gasoline vapor toward said intake section; and
   a control unit which controls operation of said valve so that a target purging rate of the gasoline vapor directed toward the intake section is determined based on an amount of gasoline injected to each combustion chamber of the engine through an injector,
   in which when said engine operates on a stratified lean mixture, said control unit corrects said target purging rate in accordance with a target air/fuel ratio of the mixture, and in which said target purging rate and the corrected target purging rate are each corrected in accordance with an amount of exhaust gas which is fed back from an exhaust section of the engine to said intake section.

5. A gasoline vapor purging system as claimed in claim 2, in which said target purging rare and the corrected target purging rate are each corrected in accordance with an amount "OGR" of operation gas, said amount "OGR" being represented by the following equation:

$$OGR = (Q_a + Q_{EGR} + Q_{PURGE})/F_R$$

wherein:
Qa amount of air measured by air flow meter,
Q$_{EGR}$: amount of exhaust gas fed back to combustion chamber,
Q$_{PURGE}$: amount of air in gasoline vapor,
F$_R$: rate of amount of fuel.

6. A gasoline vapor purging system as claimed in claim 2, in which said engine is of a type which can switch between a stratified charge combustion mode wherein the engine operates on a stratified charge of lean mixture and a homogeneous charge combustion mode wherein the engine operates on a homogeneous charge of lean mixture.

7. A gasoline vapor purging control system for use with an internal combustion engine which has a vapor purging section which temporarily traps gasoline vapor produced in a fuel supply system of the engine and feeds the same to an intake section of the engine upon operation of the engine, said control system comprising:

first means for determining a target vapor purging rate based on an amount of fuel fed to each combustion chamber of the engine and based on a predetermined relationship between fuel amount and purging rate;

second means which, when said engine operates on a stratified lean mixture, corrects said target vapor purging rate in accordance with a target air/fuel ratio of the mixture; and third means for selectively controlling the vapor purging effected by said vapor purging section in accordance with the target vapor purging rate and the corrected target vapor purging rate.

8. A gasoline vapor purging system for an internal combustion engine, comprising:

a canister connected to a gasoline supply device, the canister trapping a gasoline vapor;

an intake air passage connected to the engine, through which air flows into the engine;

a vapor purge conduit connecting the canister and the intake air passage;

a purge control valve installed in the vapor purge conduit to control the flow of gasoline vapor from the canister to the intake air passage; and a control unit having:
  a fuel delivery calculating section to calculate an amount of fuel delivered to the engine;
  a purge amount calculating section to calculate an amount of gasoline vapor purged to the intake air passage as a function of the calculated amount of delivered fuel and based on a predetermined relationship between fuel amount and purging rate; and
  a valve controlling section to control the operation of the purge control valve based on the calculated amount of the gasoline vapor, wherein, when said engine operates on a stratified lean mixture, said control unit corrects said purge control valve in accordance with a target air/fuel ratio of the mixture, and wherein the predetermined relationship is based in part on a particular engine operation mode.

9. A gasoline vapor purging system as claimed in claim 8, wherein the controller further comprises a combustion controlling section selectively controlling one of stratified combustion and homogeneous combustion.

10. A gasoline vapor purging method for an internal combustion engine, comprising:

calculating an amount of fuel delivered to the engine;

calculating an amount of gasoline vapor purged from a canister to an intake air passage of the engine as a function of the calculated amount of the fuel and based on a fixed relationship between fuel amount and purging rate; and controlling a purge control valve based on the calculated amount of the gasoline vapor, the purge control valve being installed in a conduit connecting the canister and the intake air passage, wherein, when said engine operates on a stratified lean mixture, said control unit corrects said purge control valve in accordance with a target air/fuel ratio of the mixture, and wherein the fixed relationship is based in part on a particular engine operation mode.

11. A gasoline vapor purging system as claimed in claim 1, wherein the predetermined relationship is obtained from a data map.

12. A gasoline vapor purging control system as claimed in claim 7, wherein the predetermined relationship is obtained from a data map.

13. A gasoline vapor purging system as claimed in claim 8, wherein the predetermined relationship is obtained from a data map.

14. A gasoline vapor purging method as claimed in claim 10, wherein the fixed relationship is obtained from a data map.

* * * * *